United States Patent [19]

Schrank

[11] 4,173,450

[45] Nov. 6, 1979

[54] DEVICE FOR INJECTING AIR PROCESSED TO INCREASE ITS HUMIDITY INTO OIL BURNING FURNACES

[75] Inventor: Jerome Schrank, Jamaica, N.Y.

[73] Assignee: Allied Energy Corporation, Beverly Hills, Calif.

[21] Appl. No.: 851,360

[22] Filed: Dec. 29, 1977

Related U.S. Application Data

[63] Continuation-in-part of Ser. No. 712,227, Aug. 27, 1976, abandoned, and Ser. No. 671,621, Mar. 29, 1976, abandoned.

[51] Int. Cl.² .............................................. F23J 7/00
[52] U.S. Cl. ................................ 431/190; 123/25 R; 261/18 A; 431/4
[58] Field of Search ................ 431/4, 150; 123/25 R; 261/18 A, 18 B, DIG. 42, 120; 210/242 R, 242 A

[56] References Cited

U.S. PATENT DOCUMENTS

| | | | |
|---|---|---|---|
| 1,182,121 | 5/1916 | Visscher et al. | 261/120 |
| 1,411,374 | 4/1922 | Pajalic | 261/120 |
| 3,862,819 | 1/1975 | Wentworth | 431/4 |
| 3,875,922 | 4/1975 | Kirmas | 123/25 R |
| 4,009,984 | 3/1977 | Morrison | 431/4 |
| 4,089,633 | 5/1978 | Barghout | 431/4 |

FOREIGN PATENT DOCUMENTS

566151 10/1958 Belgium ...................................... 431/4

Primary Examiner—Edward G. Favors
Attorney, Agent, or Firm—McAulay, Fields, Fisher & Goldstein

[57] ABSTRACT

Combustion efficiency in an oil burning furnace is increased by the catalization effect of consuming atmospheric air processed to increase its humidity. Atmospheric air is processed by either forcing air into a water container and bubbling it through water by a drawing, natural draft type of action through the container; or atomizing the air. Three embodiments of my invention are disclosed whereby the processed air is conveyed directly into the combustion zone, into an oil gun of an oil burning furnace or both directly into the combustion zone and the oil gun. A further increase in thermal efficiency is achieved by adding ozone to the processed air. By use of a proper nozzle, processed air is directed at the base of the flame within the furnace in substantially the same shape and direction as the flame when employed in the embodiment injecting said air directly into the combustion zone. Additional embodiments include a means for heating the water to increase vaporization; a means for adding hydrogen peroxide to the water to increase conjected catalization; a means for maintaining the pressure head substantially constant; and an inductive means of turning on a blower for bubbling air through the water.

2 Claims, 13 Drawing Figures

DEVICE FOR INJECTING AIR PROCESSED TO INCREASE ITS HUMIDITY INTO OIL BURNING FURNACES

This application is a continuation-in-part of my previous continuation-in-part application filed on Aug. 27, 1976 with Ser. No. 712,227, abandoned, of my original application filed on Mar. 29, 1976 with Ser. No. 671,621.

BACKGROUND OF INVENTION

1. Field of Invention

This invention discloses a novel device for delivering air processed to increase its humidity into an oil burning furnace either directly into the combustion zone of the furnace, into an oil gun of the furnace, or into both the combustion zone and the oil gun. This invention also discloses the addition of ozone to the processed air.

My invention specifically relates to the art of oil burner type furnaces and the economic production of air processed to increase its humidity and further processing air to add ozone. The introduction of the processed air increases the thermal efficiency of oil combustion by what is conjected to be a catalyzing reaction.

2. Description of Prior Art

The theories of injecting air processed to increase its humidity or adding ozone into a furnace or internal combustion engine in order to assist combustion are well known. A variety of devices for delivering air process to increase its humidity both into furnaces and internal combustion engines are well known in the art. However, none of the prior art discloses the novel method of producing and conveying processed air either into the combustion zone in a fluid type furnace, into an oil gun of the furnace or into both the oil gun and the combustion zone as the present invention. No prior art device discloses adding ozone to the air processed to increase its humidity as in my invention. Further, none of the prior art discloses the advantageous introduction of said processed air at the base of the flame in the combustion zone of an oil burning furnace or into the oil gun in the manner as economical as the present invention.

One example of water vapor assisted oil guns used in home heating plants in U.S. Pat. No. 3,862,819. This discloses both the method of introduction of minute quantities of water vapor directly into an oil gun from a liquid source that may be covered by oil, and an apparatus for adding water vapor to an intake blower portion of the oil gun from a liquid container. The air is conveyed to the liquid container from another portion of the intake blower and bubbled through water to create water vapor which is then passed back into the intake blower and out into a combustion zone.

My invention is distinguishable over U.S. Pat. No. 3,862,819 in that I produce water vapor from a water container without any oil covering. Further, in one embodiment air processed to increase its humidity is entered directly into the combustion zone rather than into the gun. In another embodiment, air drawn from the atmosphere and processed to increase its humidity is directed into the oil gun rather than removing air from a point downstream on the oil gun and adding it upstream. The third embodiment of my invention is also distinguishable over prior art in that atmospheric air is processed to increase its humidity and directed both into the oil gun and the combustion zone at the base of the flame in a manner that the spray is in a shape similar to that of the flame.

SUMMARY OF INVENTION

My invention relates to a DEVICE FOR INJECTING AIR PROCESSED TO INCREASE ITS HUMIDITY INTO OIL BURNING FURNACES. This invention provides for the injection of air processed to increase its humidity either directly into the combustion zone, into an oil gun or both into the oil gun and directly into the combustion zone. The injection of such processed air provides greater thermal efficiency in the combustion of oil. This invention also provides for the addition of ozone to the air processed to increase its humidity for further increases in thermal efficiency.

It has been found from experience that the preferred method of injection of the processed air directly into the combustion zone is a spray in a similar shape of the flame and directed substantially in the same direction as the flame. Another embodiment provides for the delivery of processed air into the oil gun of the furnace. The final embodiment provides for the injection of processed air both into the oil gun and directly into the combustion zone as the first embodiment.

Air is processed to increase its humidity by bubbling it through water in a water container. The water container is dimensioned with an atmospheric line to provide air directly from the atmosphere and a combustion line to convey processed air. A control valve is placed on the combustion line to control the amount of processed air conveyed. Water is maintained in the water container in a substantially constant level by the use of float control means. The float control means permits introduction of water from a water line into the water container and maintains the water at a constant level.

Atmospheric air is processed to increase its humidity by three ways prior to its being passed along into the combustion line. Air may be drawn from the atmospheric line placed below water level to bubble it and increase its humidity by the natural draft of the combustion zone in the embodiment injecting processed air into the combustion zone, by the natural drawing of the oil gun in the embodiment directing the processed air into the oil gun, and by the natural drawing or draft of both when the processed air is directed into the combustion zone and the oil gun. The air may also be bubbled through the water container by adding a blower to the atmospheric line to force it into the water container and out the combustion line. Another method of increase the humidity of air drawn from the atmosphere is to atomize it by an atomizer.

It is an object of this invention to provide a device that processes air to increase its humidity and injects the processed air into the combustion zone of an oil burning furnace to improve combustion.

It is another object of this invention to provide a device that processes air drawn from the atmosphere to increase its humidity and injects the processed air into an oil gun of an oil burning furnace to improve combustion.

It is a further object of this invention to provide a device that processes air drawn from the atmosphere to increase its humidity and injects the processed air both into the combustion zone of an oil burning furnace and into the oil gun.

It is an additional object of this invention to maximize the efficiency of fuel consumed in an oil burner type furnace by consuming air processed to increase its humidity rather than unprocessed air.

It is a still further object of this invention to add ozone to the air processed to increase its humidity.

It is still another object of this invention to provide for the introduction of air processed to increase its humidity in an oil burning furnace at the base of a flame directed in a similar shape and direction as the flame.

It is a still additional object of this invention to provide for the economical production of air drawn from the atmosphere, increase its humidity and consume it in an oil burning furnace.

Another object of this invention is to provide a simply operable and economical device to increase the thermal efficiency of oil burner type furnaces.

One aspect of the present invention resides in a device for injecting air processed to increase its humidity into oil burning furnaces comprising a water container dimensioned to receive and contain water received from a water line; an atmospheric line leading from the atmosphere into said water container, at a location below the level of water within said container; first means for drawing and bubbling atmospheric air through the water container, to process the air by increasing its humidity, by harnessing the natural draft of the combustion zone in the furnace, and then conveying said processed air to the combustion zone, including a combustion line leading from the uppermost portion of the water container to a base of the flame in a combustion zone; and means for heating water in said water container, said heating means being disposed with respect to said water container such as to provide for heat being transferred to said water during operation of said device.

Another aspect of the present invention resides in a device for injecting air processed to increase its humidity into oil burning furnaces comprising a water container dimensioned to receive and contain water received from a water line; an atmospheric line leading from the atmosphere into said water container, at a location below the level of water within said container; first means for drawing and bubbling atmospheric air through the water container, to process the air by increasing its humidity, by harnessing the natural draft of the combustion zone in the furnace, and then conveying said processed air to the combustion zone, including a combustion line leading from the uppermost portion of the water container to a base of the flame in a combustion zone; means for inductively sensing whether a motor in said oil burning furnace is energized; a blower connected to said atmospheric line; and means for stopping and starting said blower connected to said atmospheric line, said means for stopping and starting said blower being connected to and being energizable by said inductive means.

A further aspect of the present invention resides in a device for injecting air processed to increase its humidity into oil burning furnaces comprising a water container dimensioned to receive and contain water received from a water line; an atmospheric line leading from the atmosphere into said water container, at a location below the level of water within said container; first means for drawing and bubbling atmospheric air through the water container, to process the air by increasing its humidity, by harnessing the natural draft of the combustion zone in the furnace, and then conveying said processed air to the combustion zone, including a combustion line leading from the uppermost portion of the water container to a base of the flame in a combustion zone; and means for introducing hydrogen peroxide into water in said water container.

It is an additional aspect of the present invention residing in a device for injecting air processed to increase its humidity into oil burning furnaces comprising a water container dimensioned to receive and contain water received from a water line; an atmospheric line leading from the atmosphere into said water container, at a location below the level of water within said container; first means for drawing and bubbling atmospheric air through the water container, to process the air by increasing its humidity, by harnessing the natural draft of the combustion zone in the furnace, and then conveying said processed air to the combustion zone, including a combustion line leading from the uppermost portion of the water container to a base of the flame in a combustion zone; and means for maintaining a pressure head of air from said atmospheric line whereby the air which is bubbled through the water in said water container from said atmospheric line maintains a substantially constant pressure head at a predetermined point in said device.

Yet another aspect of the invention resides broadly in a device for injecting air processed to increase its humidity into oil burning furnaces comprising a water container dimensioned to receive and contain water received from a water line; an atmospheric line leading from the atmosphere into said water container, at a location below the level of water within said container; first means for drawing and bubbling atmospheric air through the water container, to process the air by increasing its humidity, by harnessing the natural draft of the combustion zone in the furnace, and then conveying said processed air to the combustion zone, including a combustion line leading from the uppermost portion of the water container to a base of the flame in a combustion zone; and means for heating water in said water container, said heating means being disposed with respect to said water container such as to provide for heat being transferred to said water during operation of said device.

DESCRIPTION OF THE PREFERRED EMBODIMENTS

Figure 1:
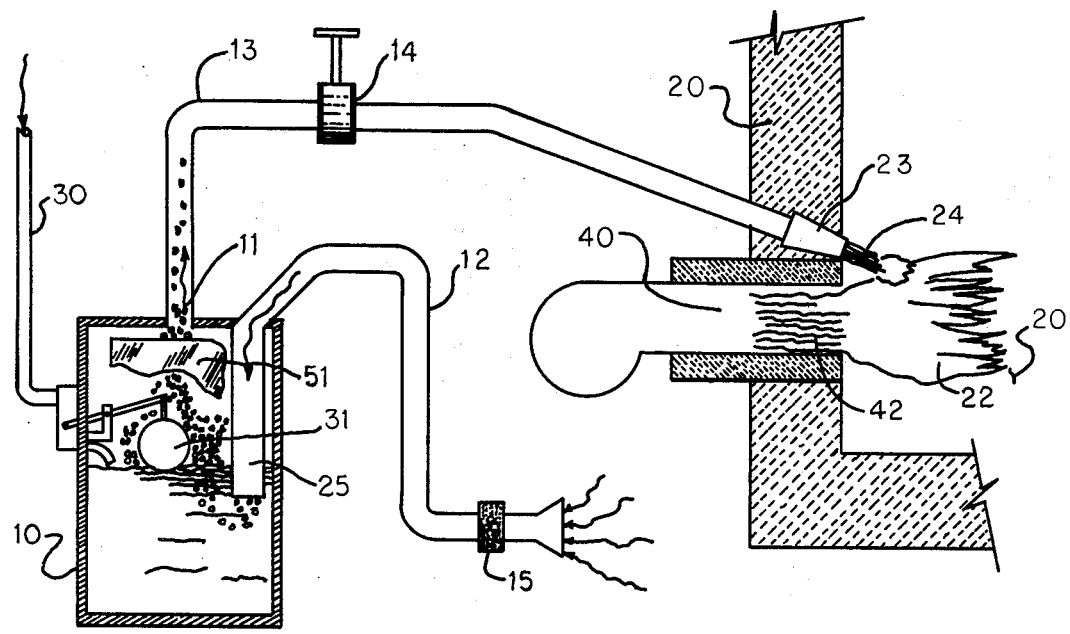
FIG. 1 is a partially cut away illustrative view of one embodiment of the present invention wherein atmospheric air is processed to increase its humidity when drawn into the combustion zone by the natural draft of the combustion zone.

Referring to the drawings, FIG. 1 discloses a first embodiment of the present invention with water container 10 being dimensioned to contain water. Atmospheric line 12 leads from the atmosphere through the container and below water level within the water container 10. An oil burner type furnace 20 is provided with oil gun 40 that shoots oil spray 42 into combustion zone 21. By the use of any ignition means known in the art (not shown), flame 22 is ignited and fed by oil spray 42 from oil gun 40. First means for bubbling and drawing atmospheric air through the water container, to process the air by increasing its humidity, by harnessing the natural draft of the combustion zone 21 of the furnace, such as combustion line 13 is an important feature of this invention. Combustion line 13 leads from the uppermost portion of the water container 10 directly into combustion zone 21 at the base of flame 22.

Water line 30 passes directly into water container 10 and is controlled by float control means 31 to maintain water level.

In operation, the natural draft created within combustion zone 21 draws air through atmospheric line 12 into the water container 10 below the water level, then out through combustion line 13 and into the combustion zone 21. Atmospheric air is processed to increase its humidity when the air is bubbled through the atmospheric line 12 below water level to create the processed air 11. Processed air 11 passes through combustion line 13 into combustion zone 21.

Control valve 14 is attached to the combustion line 13 in a manner that permits the control of the desired amount of vapor conveyed to the combustion zone. Filter 15 is attached to the atmospheric line 12 to substantially limit the entry of foreign particles into the water container 10.

Figure 4:
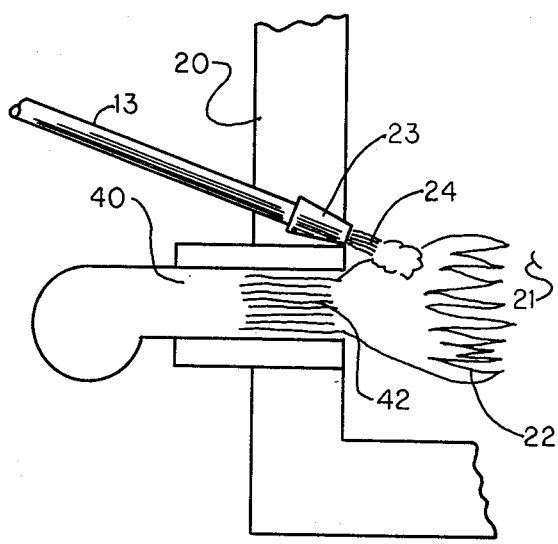
FIG. 4 is a partially cut away and expanded view showing the introduction of processed air into the combustion zone.

Referring to FIGS. 1 and 4, it is preferred that nozzle 23 be placed at the end of combustion line 13 within combustion zone 21. Nozzle 23 is dimensioned to permit a spray of the processed air 11 of similar shape as the flame 22, e.g., conical flame, conical spray; fan flame, fan spray. Spray is focused in the direction similar to that of the flame.

The introduction of the air processed to increase its humidity 11 into the combustion zone 21 at the base of flame 22 increases the efficiency of fuel burned in the furnace 20. It is conjectured that the increase in the humidity acts as a catalyst to increase the thermal efficiency of fuel combustion.

View plate 51 is dimensioned within water container 10 to permit the visual review of the water and water level within water container 10.

Figure 2:
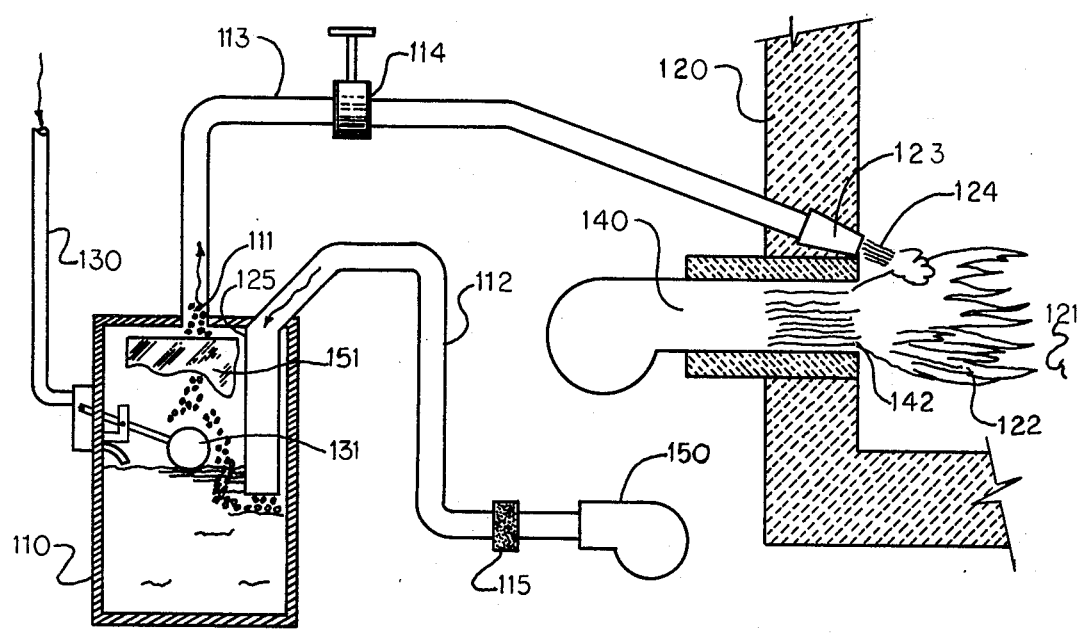
FIG. 2 is a partially cut away illustrative view of the first embodiment of the present invention wherein air is processed to increase its humidity and forced into the combustion zone by use of a blower.

FIG. 2 shows another example of the first embodiment of my invention wherein atmospheric air is processed to increase its humidity within water container 110 when blower 150 (attached to atmospheric line 112) forces air through atmospheric line 112 below water level within water container 110. The resultant processed air 111 is then forced through combustion line 113, located near the top of water container 110, directly into combustion zone 121 of an oil type furnace 120 at the base of flame 122. As in FIGS. 1 and 4, nozzle 123 directs a spray 124 of processed air 111 in the same direction and in a similar shape as flame 122. Oil gun 140 shoots oil spray 142 into combustion zone 121 which results in flame 122 after ignition by any conventional apertures (not shown).

Water line 130 and float control means 131 provides for the maintenance of water level within water container 110. Control valve 114 and combustion line 113, filter 115 placed on atmospheric line 112, and view plate 151 located on water container 110, may be placed in a similar manner and operate in a similar way as the embodiment shown in FIG. 1.

The embodiment of FIG. 2 permits the introduction of air processed to increase its humidity 111 at a high velocity directed at the base of flame 122 in FIG. 1. This increased velocity then provides a desired increase in fuel efficiency by conjectured catalyzed combustion.

An additional example of the first embodiment is shown in FIG. 2 by an arrangement wherein atmospheric air processed to increase its humidity 211 is produced by atomizer 225. Atomizer 225 is placed within water container 210 in such a manner that it draws water from water container 210 and air from atmospheric line 212 and forces the resultant processed air 211 into combustion line 213.

In the arrangement disclosed in FIG. 2, atmospheric line 212 leads both to atomizer 225 as well as the inside of water container 210. Combustion line 213 leads from the uppermost portion of water container 210 and into a combustion zone 211 of oil type furnace 220. The processed air 211 is directed by nozzle 223 placed at the end of combustion line 213. The spray 224 coming from nozzle 223 is directed at the base of the flame 222 within the combustion zone 221 in a similar manner to the previous figures, i.e., similar shape and direction.

In the same manner as the previously described figures, water level within water container 210 is kept constant by float control means 231 that controls the amount of water passing into the water container 210 from water line 230. Control valve 214 directs the amount of processed air 211 that passes through combustion line 213 into combustion zone 212. In a like manner, filter 215 is necessary to limit foreign bodies entering within water container 210. Flame 222 is produced when oil spray 242 leaving oil gun 240 is ignited by any conventional ignition means (not shown). View plate 252 again assists in review of water level.

The atomized air processed to increase its humidity 211 increases the thermal efficiency in the conjectured catalyzed combustion in a manner similar to the previously described figure.

Figure 3:
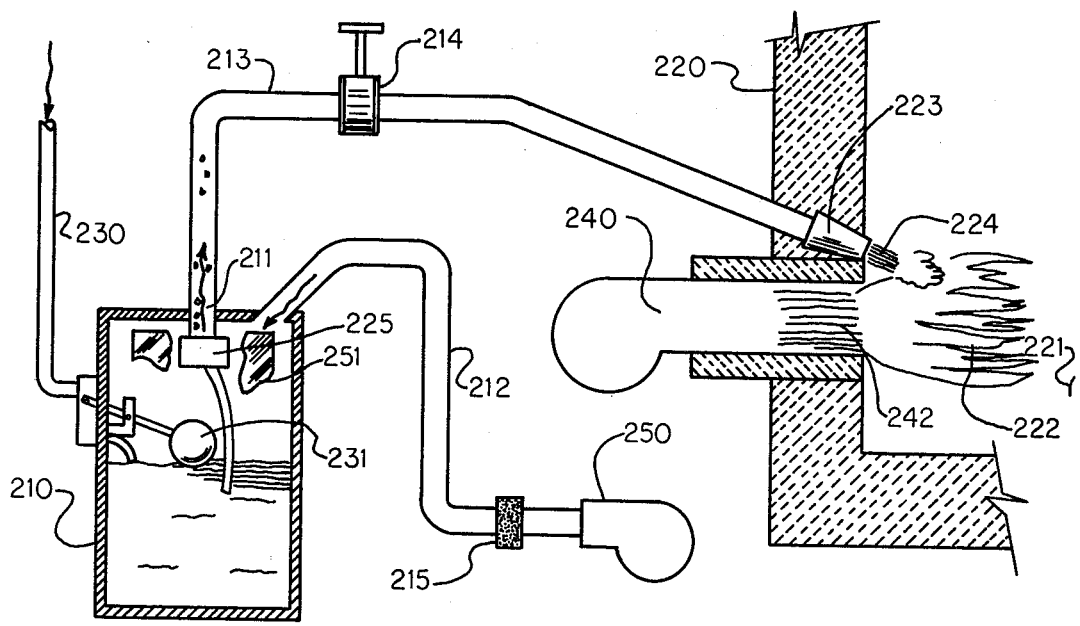
FIG. 3 is a partially cut away illustrative view of another embodiment of the present invention wherein air is processed to increase its humidity and forced into the combustion zone by use of an atomizer.
Figure 5:
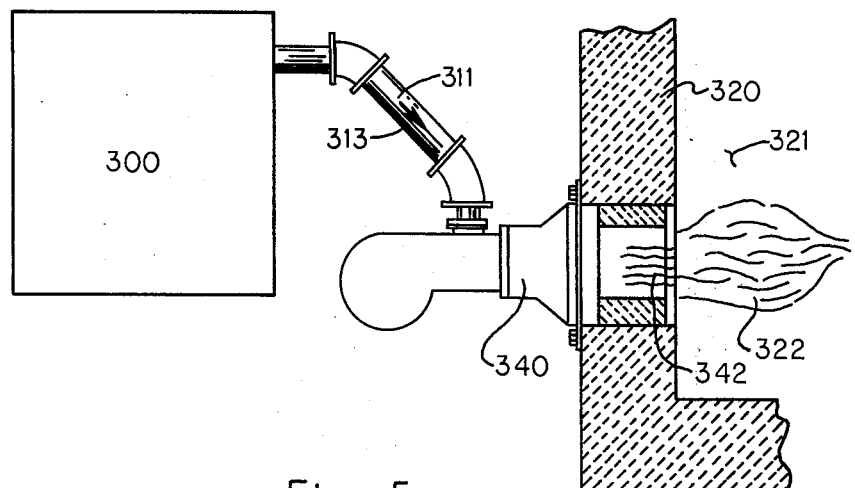
FIG. 5 is a partially cut away illustrative view of the second embodiment of the present invention wherein processed air is injected into the oil gun of an oil burner type furnace.

FIG. 5 illustrates a second embodiment of my invention. Atmospheric air is processed to increase its humidity either by use of the natural draft of the oil gun drawing the air from the atmosphere as shown in FIG. 1, by the use of a blower to process the air as shown in FIG. 2 or by atomizing it as shown in FIG. 3. A box 300 is illustrated to show that the atmospheric air can be processed in the previously described manner as described and shown in FIGS. 1, 2 and 3.

FIG. 5 illustrates the embodiment of my invention wherein processed air 311 is conveyed through combustion line 313 in any of the previously described manners directly into the oil gun 340. The processed air 311 combines with oil spray 342 and is injected into the combustion zone 321. Ignition is initially started by any conventional ignition means (not shown). The oil gun 340 shoots the oil spray 342 into furnace 320 where it ignites in the combustion zone 321 with the resultant flame 322.

As in the first embodiment, it is conjectured that air processed to increase thermal efficiency. Unlike the first embodiment, the processed air is conveyed directly into the oil gun 340 rather than the combustion zone 321. As in the first embodiment, only atmospheric air would be processed.

Figure 6:
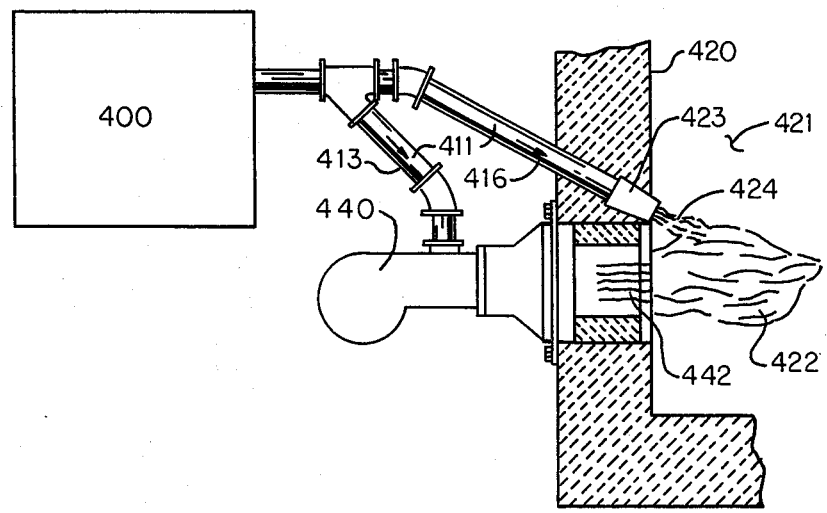
FIG. 6 is a partially cut away illustrative view of the third embodiment of the present invention wherein processed air is injected both into the oil gun of an oil burner type furnace and directly into the combustion zone of the furnace.

FIG. 6 illustrates a third embodiment of my invention. Atmospheric air is processed to increase its humidity either by the natural draft as shown in FIG. 1, by the use of a blower to process the air as shown in FIG. 2, or by atomizing it as shown in FIG. 3. A box 400 is illustrated to show that the atmospheric air can be processed in the previously described manner as shown and described in FIGS. 1, 2 and 3.

FIG. 6 illustrates the embodiment of my invention wherein second means for drawing and bubbling atmospheric air through the water container, to process said air by increasing its humidity, by harnessing the negative pressure of oil gun 440, relative to the atmosphere, as well as the natural draft of combustion zone 421 includes a combustion line 413. Combustion line 413 leads from the uppermost portion of the water container to the oil gun 440. Connection line 416 leads from combustion line 413 through furnace 420 directly into the combustion zone 421. Processed air 411 also passes through combustion line 416 and nozzle 423 attached to combustion line 416 where it is injected in the manner similar to the shape and direction of flame 422. The processed air 411 combines with the oil spray 442 which is injected into the combustion zone 421 as well as being injected directly into the combustion zone 421 through connection line 416 and nozzle 423.

As in the first embodiment, it is conjectured that air processed to increase its humidity catalyzes a combustion reaction to increase thermal efficiency. Processed air is conveyed into the combustion zone both through the oil gun 440 and directly into the combustion zone. As in the previous embodiments, only atmospheric air would be processed.

Figure 7:
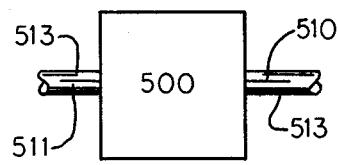
FIG. 7 is an illustrative view showing placement of a combustion line of means for producing and adding ozone to the processed air.

FIG. 7 illustrates the addition of means for producing and adding ozone 500 attached at any point along combustion line 513. Air processed to increase its humidity 511 is conveyed to said means for producing and adding ozone to the processed air 500.

Any standard device conventional known can be used to produce ozone and add it to the processed air 511. For example, any known electrostatic device can be attached to the combustion line 511 to manufacture the ozone and add it to the processed air. The resultant processed air with ozone 510 would continue along combustion line 513 until eventual injection into the oil burning furnace.

Figure 8:
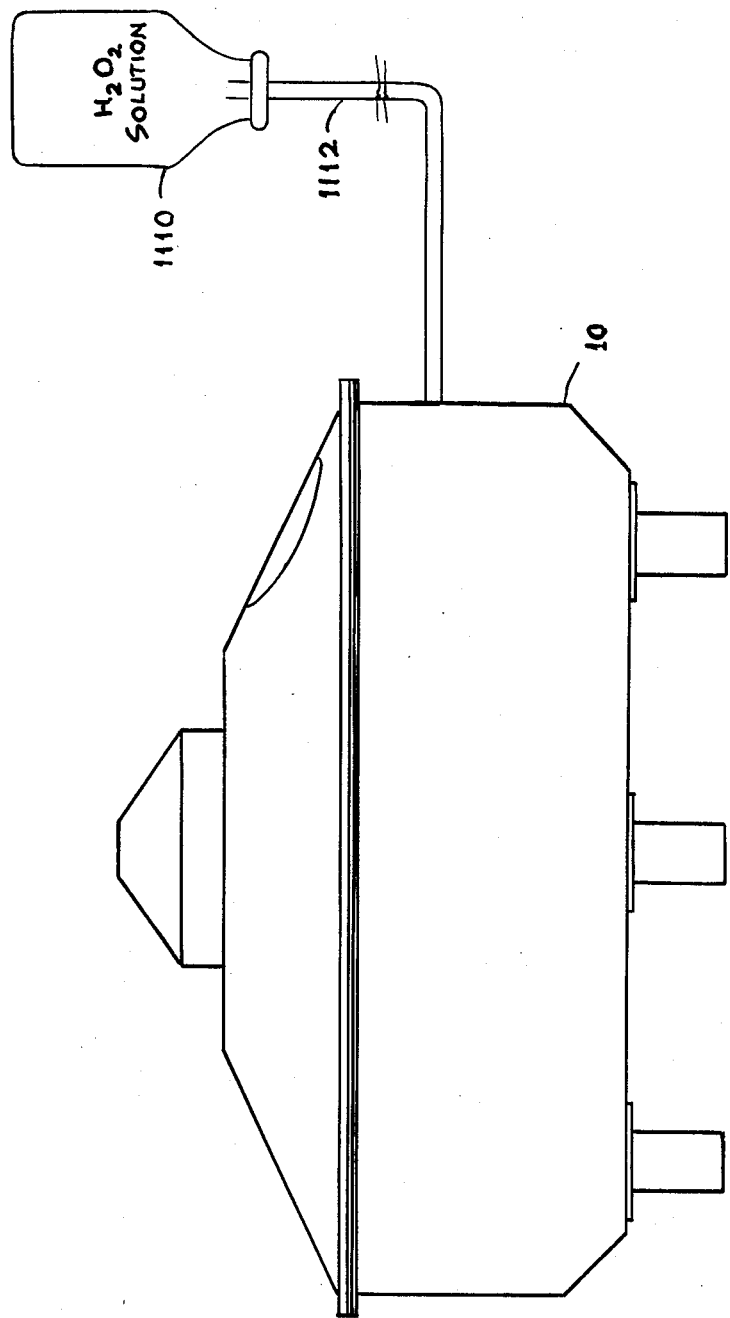
FIG. 8 is an illustrative view showing a means for injecting hydrogen peroxide into the water.
Figure 9:
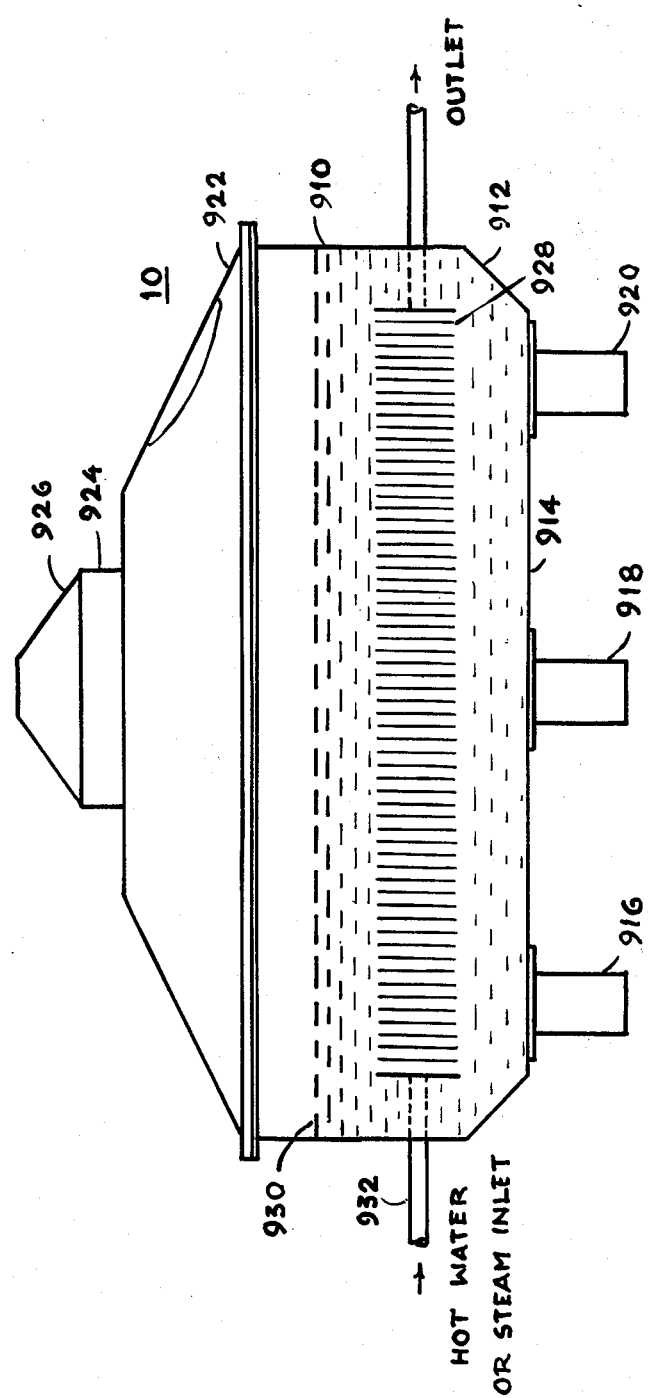
FIG. 9 is an illustrative view showing a means for heating the water in the water container.

Referring now to FIG. 9, an alternative embodiment of the water container 10 is shown in detail. The water container 10 comprises a cylindrical body 910 having a conical section 912 contiguous to 910 and a bottom 914 with three supports 916, 918 and 920. The water container 10 has a truncated conical top member 922 and a smaller cylindrical member 924 with a truncated conical member 926 disposed thereon. In this alternative embodiment of the water container 10, a heating element 928 is immersed in the water 930 therein. Preferably hot water or steam from the oil burner type furnace 20 is fed through an input line 932 through the heating element 928 for heating the water 930 whereby its evaporation rate is increased and therefore the absolute humidity of the humidified air, which is injected into the oil burner furnace 20, is increased, that is, the air contains more water vapor therein. In an alternative embodiment of the embodiment of FIG. 8, the water is heated by an electric element instead of a heating element 928 or alterntively by some other source of heat.

FIG. 8 shows an alternative embodiment of the water container 10. In this alternative embodiment, a container 1110 for containing hydrogen peroxide solution is connected through a hose 1112 to the water container 10. The hydrogen peroxide container 1011 is preferably of the type of a bottle which is similar to that used for intravenous feedings in that it has a metering nozzle therein, well known in the art, for metering the hydrogen peroxide solution to the water container 10 through the hose 1112, an electrical solenoid valve controlling the flow may be connected in the hose 1112 which is energized by the oil burner 1014 and controlled by an inductive pickup such as described in FIG. 10. By mixing hydrogen peroxide with the water in the water container 10 an increase of the oxygen available for combustion is achieved. Also, it is believed that the addition of hydrogen peroxide may provide an additional catalytic effect.

Figure 10:
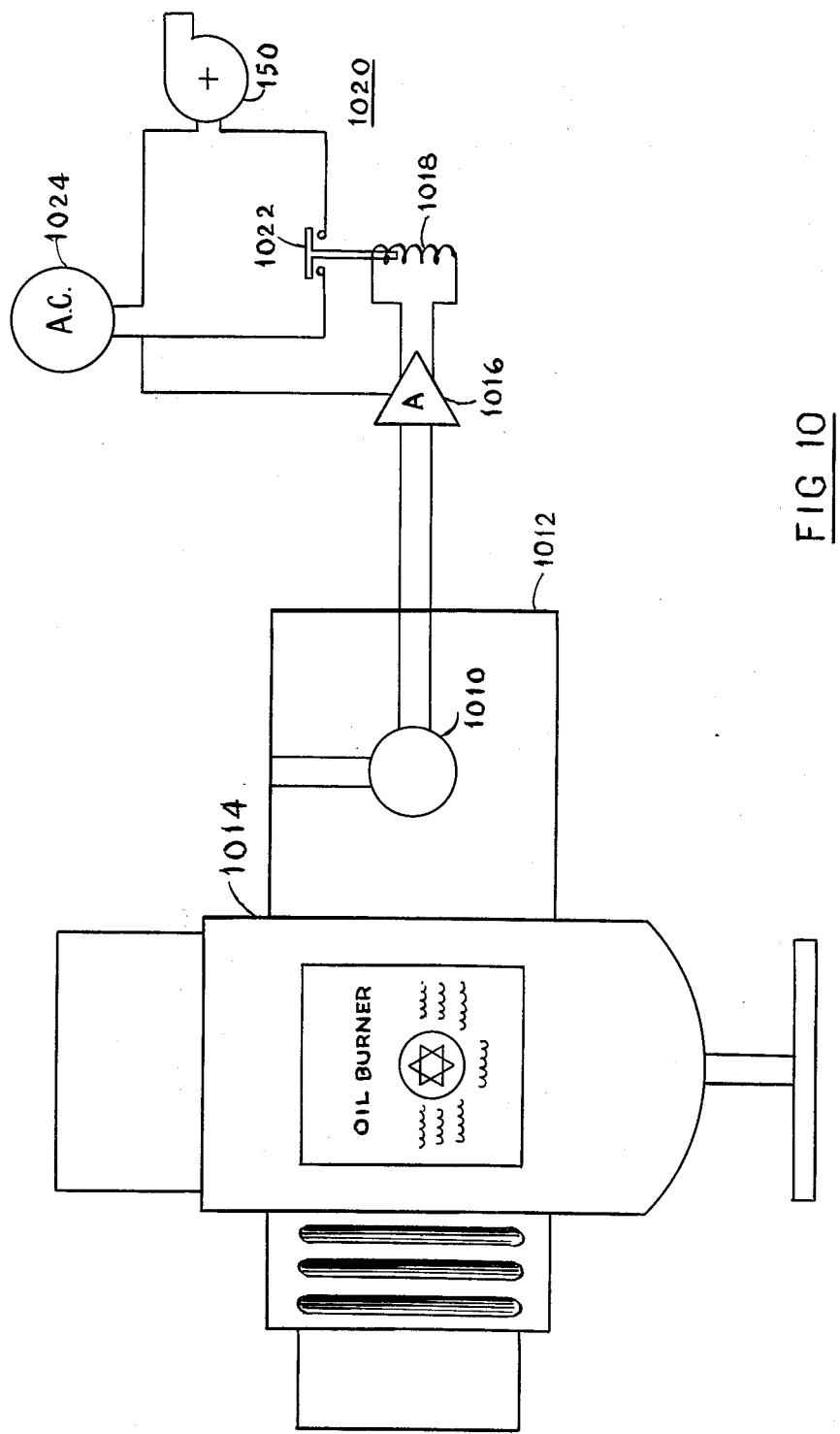
FIG. 10 is an illustrative view showing an inductive pickup for turning a blower on and off.

Referring now to FIG. 10, an inductive pickup 1010 is shown disposed on an oil burner motor 1012 of the oil burner 1014. The signal from the inductive pickup 1010 is connected to an amplifying device 1016 having an output connected to the coil 1018 of a relay 1020. Contacts 1022 of the relay 1020 are connected in series with a source of electric power, preferably an AC voltage source, which is controlled by the contacts 1022 for applying the AC voltage 1024 to the blower 150 shown in FIG. 2. With the use of the inductive pickup 1010, if the blower 150 is desired, as shown in the embodiment of FIG. 2, no connection need be made to the electrical wiring of the oil burner 1014 which has the great advantage of not requiring, in most geographical areas, a licensed electrician for the installation of the blower 150 and ancillary equipment. The entire package can be installed by someone other than a licensed electrician, such as a layman or handy man. The amplifier 1016 whih is also connected to the source of AC voltage 124 may be eliminated in yet another alternative embodiment by the use of a very sensitive relay 1018 which would be triggered directly by the series combination of the inductive pickup 1010 and the AC source 1024. Inductive pickups are well known in the art and may comprise an induction coil.

Figure 11:
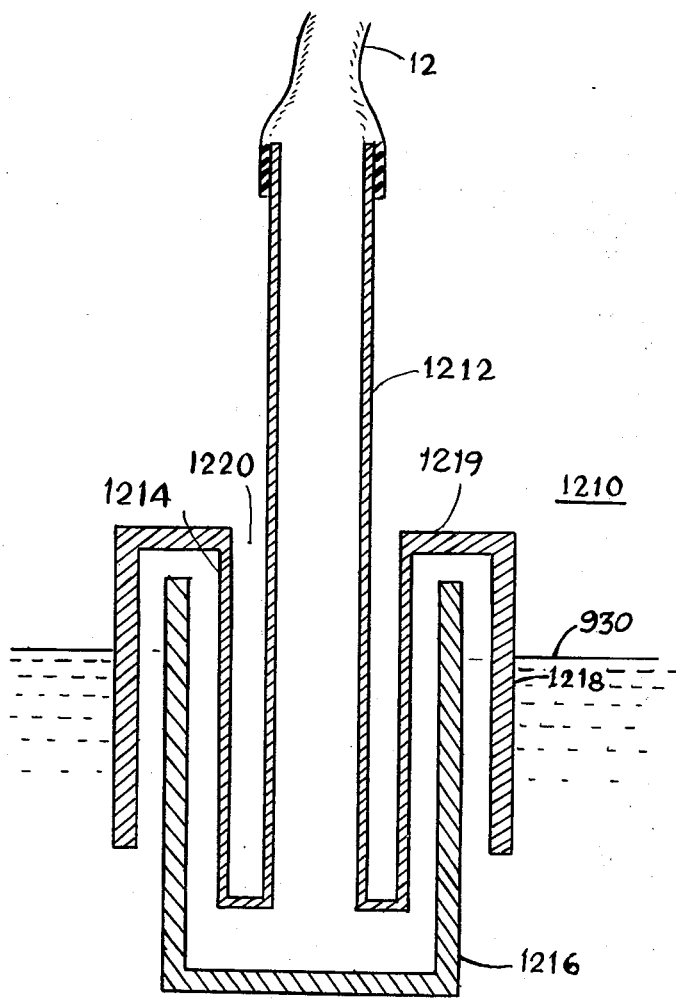
FIG. 11 is an illustrative view of a pressure head maintaining device for maintaining the pressure head of the air at a substantially constant value.

Referring now to FIG. 11, in order to maintain the pressure head of the air entering and/or leaving the water container 10, a head maintaining float device 1210 is connected to the atmospheric line 12. A preferred embdiment of the float device 1210 comprises an extension 1212 of the atmospheric line 12 which is connected to a cylindrical member 1214 having a diameter somewhat substantially larger than the extension 1212 thereby forming an air space between the extension 1212 and the cylindrical member 1214. The bottom of the extension 1212 and the cylindrical member 1214 are connected and made air tight such that the air space between the cylindrical member 1214 and the extension 1212 excludes any fluid from entering therein. Disposed about the cylindrical member 1214 there is a cup member 1216 having a length of its cylindrical part 1216a and a diameter substantially larger than and substantially longer than the length of a member 1214. Disposed about the cylindrical member 1214 another outer cylindrical member 1218 connected to the cylindrical member 1214 by a disc 1219 having an orifice therein for admitting air into the air space between the cylindrical member 1214 and the extension 1212. The disc 1218 is affixed to the upper end of the cylindrical member 1214 forming with the outer member 1218 a cylindrical area with a hole therein. The diameter of the outer cylindrical member 1218 is sufficient to admit the cup member 1216 and air between the outer cylindrical member 1218 and the inner cylindrical member 1214.

The cup member 1216 floats in the water 930 in the container 10 and provides substantially constant buoyancy and thereby a substantially precise pressure head between the surface of the water and the air being pumped into the atmospheric line 12. The buoyancy of the cup member 1216 remains substantially constant and therefore the pressure and volume of the air also remains substantially constant. As the level of the water 930 varies in the water container 10, the cup member 1216 moves up and down with respect to the outer cylindrical member 1218 and the inner cylindrical member 1214. The length of the cylindrical part 1216a is chosen with respect to the corresponding length of the cylindrical members 1214 and 1218 to obtain the substantially constant pressure head desired.

Figure 12:
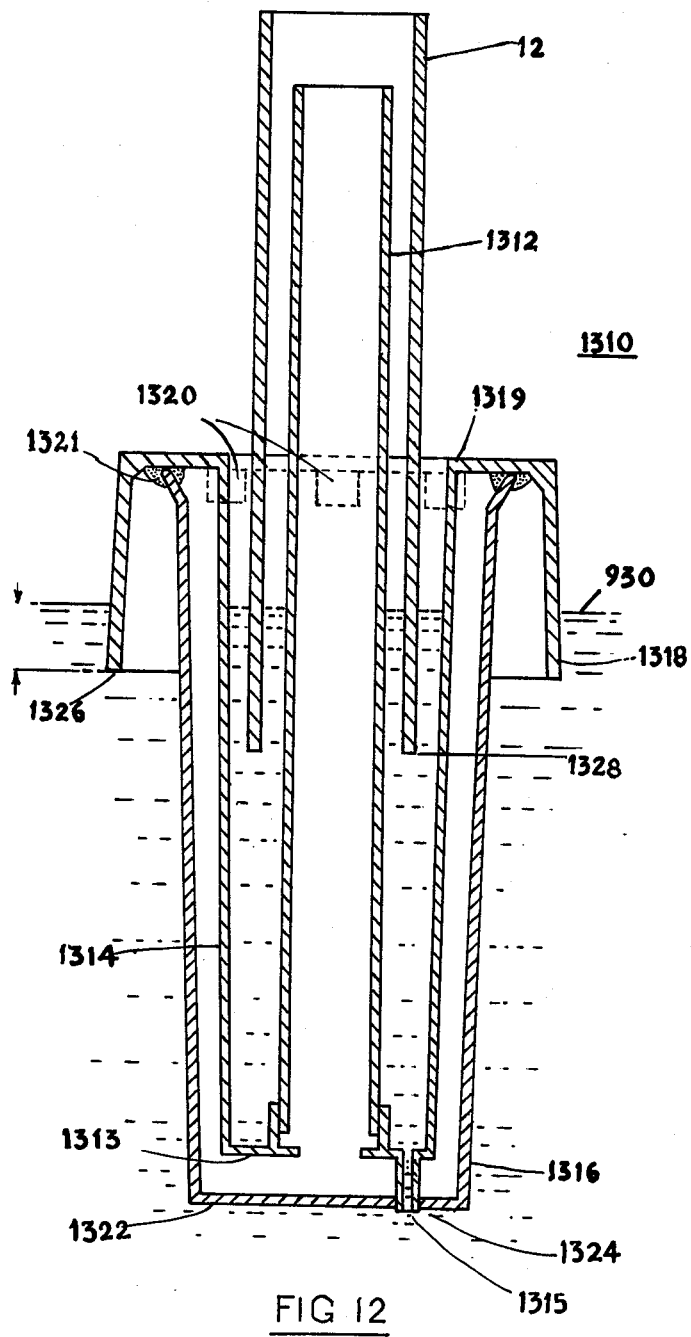
FIG. 12 is a sectional view of an alternative embodiment of a pressure head maintaining device according to the invention as described in FIG. 11.
Figure 13:
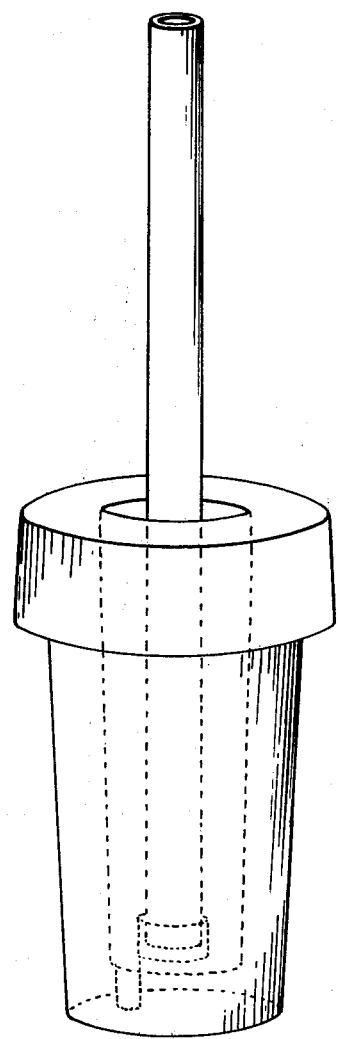
FIG. 13 is a perspective view of the alternative embodiment of the invention described in FIG. 12.

Referring now to FIG. 12, an alternative embodiment of the device of FIG. 11 is shown to maintain the pressure head of the air entering and/or leaving the water container 10. A head maintaining float device 1310 is inner-connected with the atmospheric line 12 by a means to be described in detail infra. The alternative embodiment of the float device 1310 comprises an extension tube 1312 which extends to the bottom of a member 1314 conical truncated. The bottom of the conical truncated 1314 has a smaller diameter than the top thereof. A disc 1313 connects the extension tube 1312 to the truncated conical member 1314. The disc 1313 has an orifice in the center thereof disposed in a relationship with the extension 1312 in order to admit air from 1312 through an orifice or in the disc 1313. At a point on the disc 1313 providing the orifice a small cylinder 1315 juts therefrom to form the orifice for admitting water into the space between the extension tube 1312 and the truncated conical member 1314. Extending horizontally from the top of the truncated conical member 1314 is a disc 1319 having an annular opening therein for admitting air into the air space between the truncated conical member 1314 and the extension tube 1312. At the outside periphery of the disc 1319, a cylinder 1318 extends vertically downward. In the space between the vertically extending cylinder 1318 and the truncated conical member 1314 a cup member 1316 is disposed which are fastened together by locking means 1321. The locking means 1321 either cement or fasten the disc 1319 to the cup member 1316 by the use of cement or by a thermoplastic operation performed upon the disc 1319 and the cup 1316 both of which are preferably made of a plastic material. The cup member 1316 has a bottom 1322 which as a hole or orifice 1324 therein which accepts the small cylindrical member 1315 tightly thereby forming a water tight seal between these members. Between the sealing means 1321 are provided orifices 1320 such that the air can flow freely over a portion of the top of the cup member 1316. Water enters through the orifice in the cylindrical member 1315 into the space between the extension tube 1312 and the truncated conical member 1314. This space is dimensioned such that the water entering therein provides the proper buoyancy for the head maintaining float device 1310 and thereby submerges the bottom end 1326 of the cylindrical member 1318 into the water surface 930 to a predetermined depth of penetration which remains subtantially constant during the operation of the head maintaining float device 1310.

The height of the head maintaining device 1310 from the top of the disc 1319 to the bottom of the cup 1322 is approximately 10.5 centimeters. The length of the cylindrical member 1318 is approximately 3.4 centimeters. The inner diameter of the extension tube 1312 is approximately 1 centimeter and the outer diameter is approximately 1.3 centimeters. The inner opening in the disc 1319 is approximately 3.5 centimeters. The size of the cup member 1316, which is also conical, and having the smaller diameter of the truncated cone at the bottom thereof just as the truncated conical member 1314 has the smaller diameter of the bottom thereof.

The relationship of the depth of penetration of the end of the cylindrical member 1318 and the volume between the extension tube 1312 and the truncated conical member 1314 which receives water through the orifice of the cylinder 1315 is substantially critical in the operation of the alternative embodiment of the device as shown in FIG. 12. At the present time it is believed that the dimensions of the alternative embodiment of FIG. 12 are at least an optimization of the first order of the dimensions of the head maintaining float device.

The atmospheric line 12 in the alternative embodiment of FIG. 12 comprises a tube which has a diameter greater than the diameter of the extension 1312 but less than the smaller diameter of the truncated conical member 1214. The lower end 1328 of the atmospheric line 12 is immersed in the water contained between the extension 1312 and the truncated conical member 1314. During proper operation, the end 1328 of the atmospheric line 12 always extends below the lower end 1326 of the cylindrical member 1318. Therefore, no air from the atmospheric line 12 will be bubbled under the end 1328 of the atmospheric line 12, but instead all the air will flow beneath the end of the extension 1312 between the inside of the cup 1316 and the outside truncated conical member 1314, over the top of the cup 1316, through the openings 1320, then between the sides of the cup 1316 and the cylindrical member 1318, and finally bubble out underneath the lower end 1326 of the cylindrical member 1318. Therefore, a substantially constant area for bubbling between the sides of the cup 1316 and the inside of the cylindrical member 1318 is maintained. This area provides a substantially constant head of pressure for humidified air since the depth of penetration of the cylindrical member 1318 into the water is maintained substantially constant. As the level of the water 930 varies due to evaporation thereof by the air passing through the head maintaining float device 1310 the atmospheric line 12 and the extension 1312 make slideable contact with one another at some point. Moreover, no air flows therebetween because the water level 930 is maintained above the end 1328 of the atmospheric line 12.

As it may readily appear to those skilled in the art, various changes may be made in relative locations and arrangements of the several parts without departing from the sphere and scope of this invention. It is not meant to limit the invention except by the following claims:

I claim:

1. A device for injecting air processed to increase its humidity into oil burning furnaces comprising:
   a. a water container dimensioned to receive and contain water received from a water line;
   b. an atmospheric line leading from the atmosphere into said water container, at a location below the level of water within said container;
   c. first means for drawing and bubbling atmospheric air through the water container, to process the air by increasing its humidity;
   d. means for inductively sensing whether a motor in said oil burning furnace is energized;
   e. a blower connected to said atmospheric line; and
   f. means for stopping and starting said blower connected to said atmospheric line, said means for stopping and starting said blower being connected to and being energizable by said inductive means.

2. A device for injecting air processed to increase its humidity into oil burning furnaces comprising:
   a. a water container dimensioned to receive and contain water received from a water line;
   b. an atmospheric line leading from the atmosphere into said water container, at a location below the level of water within said container;
   c. first means for drawing and bubbling atmospheric air through the water container, to process the air by increasing its humidity, by harnessing the natural draft of the combustion zone in the furnace, and then conveying said processed air to the combustion zone, including a combustion line leading from the uppermost portion of the water container to a base of the flame in a combustion zone; and
   d. means for introducing hydrogen peroxide into water in said water container.

* * * * *